United States Patent [19]
Lim et al.

[11] Patent Number: 5,532,825
[45] Date of Patent: Jul. 2, 1996

[54] ADD-ON SCANNER FOR EXISTING INK JET PRINTER

[75] Inventors: Chuin K. Lim, Singapore, Singapore; Frank L. Cloutier, Corvallis, Oreg.

[73] Assignee: Hewlett-Packard Company, Palo Alto, Calif.

[21] Appl. No.: 113,878

[22] Filed: Aug. 30, 1993

[51] Int. Cl.⁶ .............................. H04N 1/23; H04N 1/04; H04N 1/034; B41J 29/13
[52] U.S. Cl. .............. 358/296; 358/474; 347/3; 347/108
[58] Field of Search ............................ 358/296, 400, 358/401, 442, 444, 468, 472, 474, 483, 494, 496–498, 502, 505, 514; 347/2–4, 104, 105, 108; 400/70, 175, 691–693; 395/112, 114–116, 150

[56] References Cited

U.S. PATENT DOCUMENTS

| | | | |
|---|---|---|---|
| 3,272,918 | 9/1966 | Koli et al. | 178/6.6 |
| 3,560,641 | 2/1971 | Taylor et al. | 178/6.6 |
| 3,800,076 | 3/1974 | Koizumi | 178/6.6 |
| 4,069,486 | 1/1978 | Fox | 346/75 |
| 4,106,061 | 8/1978 | Burnett | 358/296 |
| 4,112,469 | 9/1978 | Paranjpe et al. | 358/296 |
| 4,266,250 | 5/1981 | Heinzl et al. | 358/285 |
| 4,302,782 | 11/1981 | Gunning et al. | 358/296 |
| 4,318,135 | 3/1982 | Allis et al. | 358/474 |
| 4,321,627 | 3/1982 | Hooker et al. | 358/286 |
| 4,475,130 | 10/1984 | Miller et al. | 358/335 |
| 4,496,984 | 1/1985 | Stoffel | 358/293 |
| 4,525,748 | 6/1985 | Carbone | 358/472 |
| 4,583,126 | 4/1986 | Stoffel | 358/401 |
| 4,649,437 | 3/1987 | Watanabe | 358/286 |
| 4,651,229 | 3/1987 | Coli | 358/285 |
| 4,683,501 | 7/1987 | Carena et al. | 358/293 |
| 4,706,128 | 12/1984 | Tanioka et al. | 358/286 |
| 4,755,877 | 7/1988 | Vollert | 358/285 |
| 4,823,195 | 4/1989 | Ito | 358/285 |
| 4,839,741 | 6/1989 | Wilson | 358/293 |
| 4,851,925 | 7/1989 | Yamasaki et al. | 358/296 |
| 4,862,289 | 8/1989 | Shimada | 358/296 X |
| 4,920,421 | 4/1990 | Stemmle | 358/296 |
| 4,947,345 | 8/1990 | Paradise et al. | 358/442 X |
| 4,980,780 | 12/1990 | Tanaka | 358/401 |
| 5,070,410 | 12/1991 | Hadley | 358/296 |
| 5,110,226 | 5/1992 | Sherman et al. | 358/473 X |
| 5,264,948 | 11/1993 | Imoto | 358/474 |

FOREIGN PATENT DOCUMENTS

| | | | |
|---|---|---|---|
| 0471369 | 2/1992 | European Pat. Off. | H04N 1/04 |
| 57-45774 | 3/1982 | Japan . | |
| 59-228462 | 12/1984 | Japan . | |
| 2152326 | 7/1985 | United Kingdom | H04N 1/028 |

*Primary Examiner*—Peter S. Wong
*Assistant Examiner*—Eric Frahm

[57] ABSTRACT

A scanner removably mountable on a printer output tray for scanning images on print media driven through a print media path in the printer. The scanner includes a hood with a light source which is mounted internally on the hood and directed toward the print media path to illuminate an image on the print media. A mirror reflects the image illuminated by the light source to a sensor which detects the reflected image and converts it to an electrical signal. The scanner is operable under the control of a scanner electronics cartridge which is inserted into a printer access port normally designated to receive font cartridges. The scanner electronics cartridge communicates the electrical signals to a host personal computer over an I/O cable that is connected between the scanner and the personal computer.

20 Claims, 4 Drawing Sheets

ADD-ON SCANNER FOR EXISTING INK JET PRINTER

BACKGROUND OF THE INVENTION

1. Field of the Invention

This invention relates generally to optical scanners used to convert optical images into digital data for subsequent reproduction and/or manipulation, and more particularly to optical scanners used in conjunction with printers.

2. Description of the Related Art

Optical scanners have long been used to capture existing optical images so that they may be transferred, stored, or manipulated using a more convenient means, typically a digital computer. The scanner captures the image by illuminating the image with a light source and sensing reflected light. The presence or absence of reflected light at a particular point determines the image characteristics at that point. For a black and white image, the absence of reflected light indicates a black region, while the presence of reflected light indicates a white region. For gray scale images the intensity of the reflected light must also be measured to determine the intensity of the image. In the case of color, separate light sources are used to detect the presence or absence of each color component.

Although use of scanners has shown significant increase in the recent past, the commercial acceptance of the individual scanner has been limited by its cost and consumption of precious office space. Although not as expensive as many other computer peripherals, e.g., laser printers, the additional cost can be prohibitively expensive, especially if the device is used only by a single user.

In addition to the cost, the consumption of space by a scanner may also be prohibitive. The computer user already has a computer, a monitor, a printer, and possibly a fax machine. The computer user, faced with steadily shrinking office space, has been reluctant to include additional computer peripherals in the confines of the user's immediate office space, especially if the device is not used frequently. However, this is exactly what is required for commercial success of the scanner. Commonly, peripherals that are not in constant use are relegated to a common office area where the device is shared by all of the people in the office. The effect of relocating the peripheral away from the user produces a productivity loss, resulting from walking to and from the device, proportional to the number of times the user must use the device. Further productivity is lost when the device is currently in use by another person in the office. Recently, manufacturers have attempted to address these concerns by combining computer peripherals into so-called multi-function-peripherals (MFPs) incorporating one or more of the following: printer, copier, facsimile and scanner. Typically, these devices are based around an electrophotographic (EP) engine. The EP engine executes a process by which a polymer toner is transferred onto a print media and then fused onto the media. Electrophotographic engines are being used in black and white copiers, printers, and facsimiles and thus provide a good base for MFPs. Color EP engines are available but are considerably more expensive than black and white EP engines. As a result, color EP engines are used in only the most cost insensitive applications, e.g., color proofing, and, consequently, have not been used as a platform for MFPs.

The MFP has not been widely accepted by the marketplace. The primary reasons being, once again, cost and space. Although their cost is less than the combined cost of the devices purchased separately, the MFP is still too expensive for each computer user to own one, especially considering that most computer users already own one or more of the devices, most frequently a printer. In many cases, users own less expensive printers, such as an ink-jet printer, especially small business and/or home users who require color printing. In addition, the MFPs, because of their increased functionality, consume more space than any one of the devices separately. As a result, these devices, if purchased at all, are once again relegated to a large common area where the device is shared by the office at large, resulting in the aforementioned productivity losses.

Accordingly, a need remains for an inexpensive optical scanner that consumes a minimum amount of additional space which, moreover, can operate in conjunction with existing low-cost ink-jet printers.

SUMMARY OF THE INVENTION

It is, therefore, an object of the invention to disclose a method and corresponding apparatus for adding scanning capability an existing ink-jet printer with little or no additional space required.

Another object of the invention is to disclose an optical scanner which requires no alignment when operated in conjunction with an ink-jet printer mechanism.

A further object of the invention is to disclose an optical scanner which can accept cut-sheet and fan-fold paper.

A further object of the invention to provide an apparatus which can be incorporated into an ink-jet printer to provide scanning capability in addition to the printing capability of the printer. In the preferred embodiment, a scanner is contained in a housing which is mounted on a paper output tray which forms a part of the printer.

Another object of the invention is to describe a method of adding the optical scanning capability to an existing ink-jet printer.

The foregoing and other objects, features and advantages of the invention will become more readily apparent from the following detailed description of a preferred embodiment of the invention which proceeds with reference to the accompanying drawings.

DETAILED DESCRIPTION OF THE PREFERRED EMBODIMENT

Figure 4:
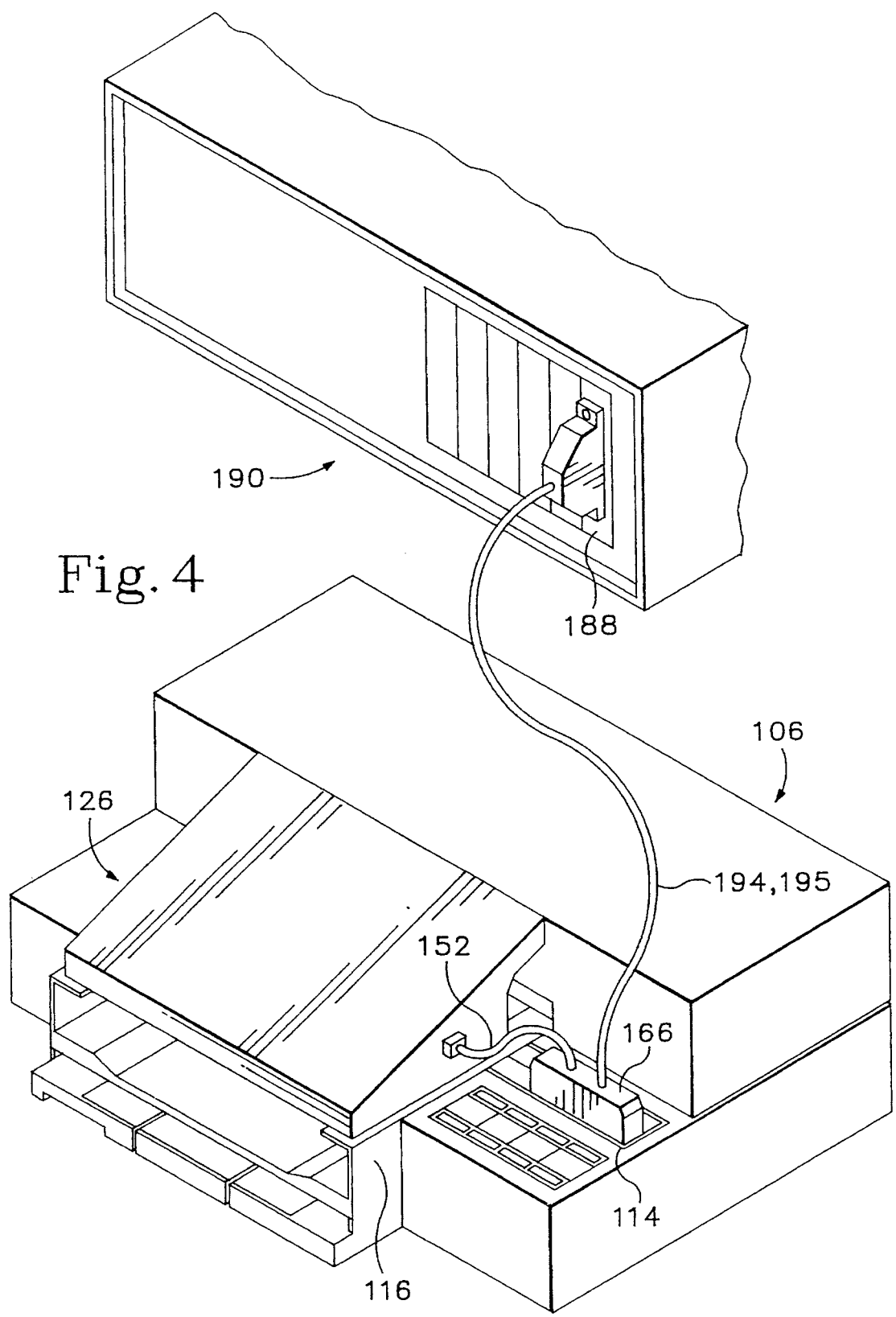
FIG. 4 is a perspective view of the present invention.

Referring to FIG. 4, an ink-jet printer mechanism is indicated generally at 106. The mechanism includes of an internal frame which includes a transverse rod 112. The frame provides structure to the printer and defines a print media path 118, through which the print media passes. The frame is encased by an enclosure 108. Mounted on the frame is a carriage 110 which houses an ink-jet cartridge 120, commonly known as a printhead. The printer mechanism also contains a printer access port 114 for coupling additional electronics, such as read-only-memory (ROM) containing additional fonts, to the printer electronics (not shown in FIG. 4).

Neither a paper advancing means nor a carriage advancing means are explicitly shown. Both are housed within the printer enclosure 108. The ability to advance paper in a precise and controlled manner is known in the art. Typically, in ink-based printers, the paper is advanced by a predetermined amount after each pass of the printhead across the print media. The amount that the print media is advanced is determined by the amount of area covered by the pass of the printhead. One common approach is to grasp the media between two sets of pinch-rollers rotating in opposite directions with one or both driven by stepper motors. The printer electronics then pulse the stepper motors to advance the media by a fixed step. The carriage 110 is advanced by similar means with carriage movement being synchronized to firing ink nozzles on cartridge 120, as is known in the art.

Figure 1:
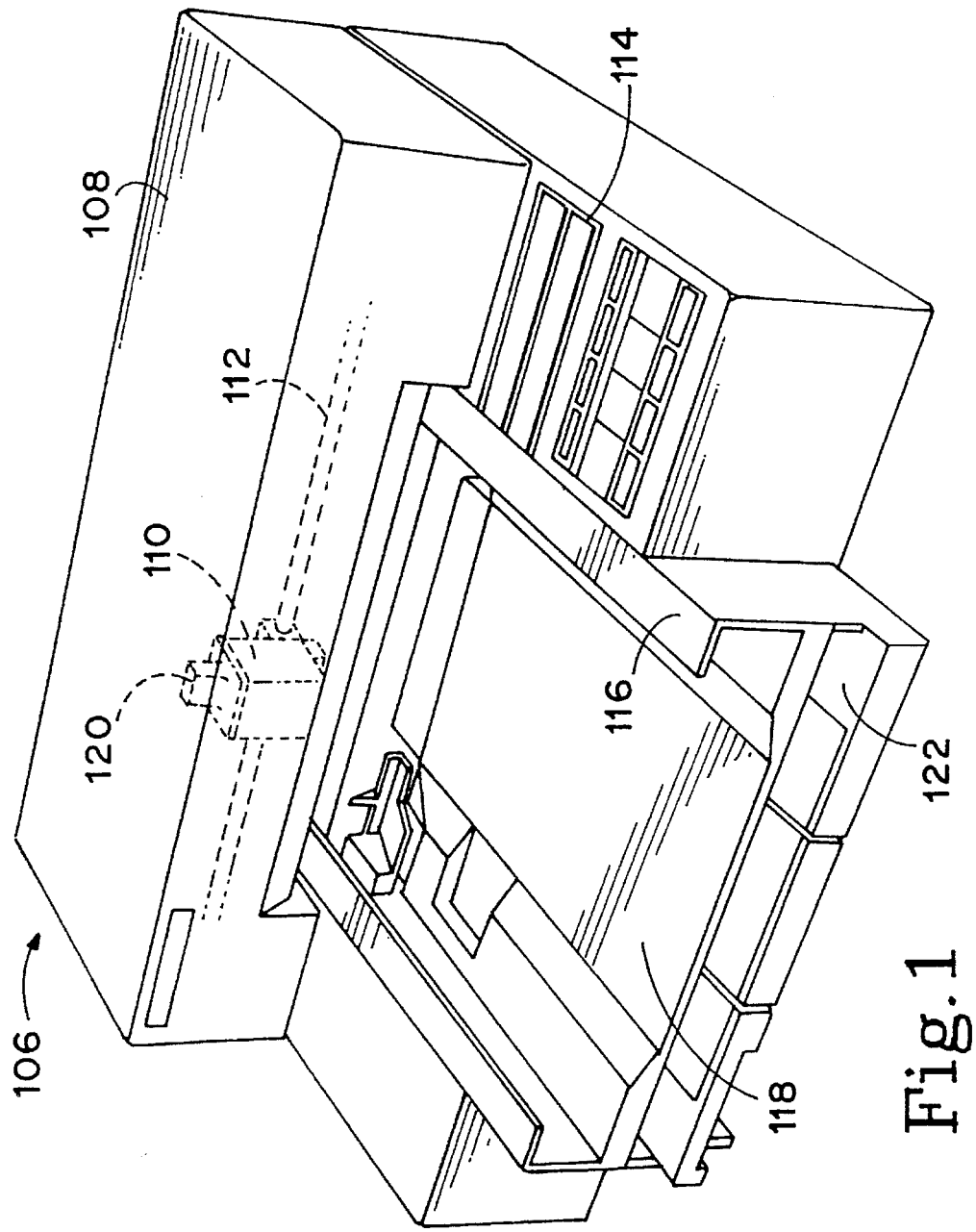
FIG. 1 is a prior art ink-jet printer mechanism of the type having a fixed output tray capable of supporting a scanner mechanism according to the invention.
Figure 2:
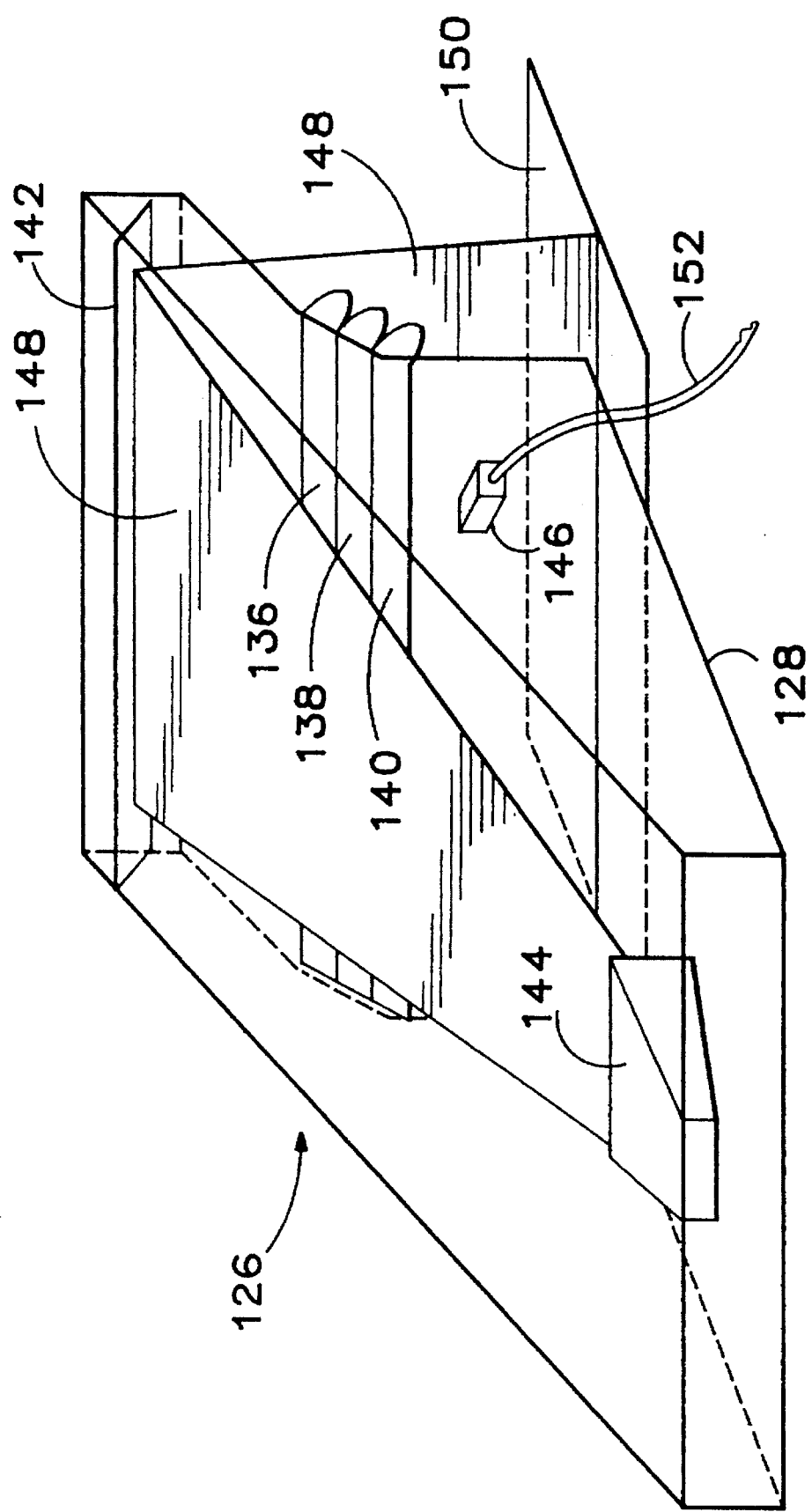
FIG. 2 is a perspective view of the scanner assembly of the present invention.

The media is held in an input tray 122 prior to being advanced through the print media path. Because the media is only advanced in response to the movement of the printhead, ink-based printers have the ability to accept continuous feed paper, such as that used in dot-matrix printers. After the media is advanced through the print media path 118, the media is deposited in an output tray 116. According to the invention, the scanner mechanism, indicated generally at 126 in FIG. 2, is designed to be mountable on the output tray 116. Consequently, the scanner is precisely aligned to the print media by virtue of its position on the output tray.

The scanner is mounted directly over the print media as it passes through the print media path. This provides the scanner with an unimpeded view of the print media. Referring now to FIG. 2, three light sources 136,138,140 are mounted on the rectangular scanner enclosure, or hood, 128 and span the width of the print media. Each of the three light sources provides one of the color primitives required for full color reproduction, i.e., red-green-blue or cyan-yellow-magenta. The light sources are similar to those used in the Scan Jet IIc scanner manufactured by Hewlett Packard Co., which are of the florescent type. However, as would be apparent to someone skilled in the art, a variety of similar light sources could be used such as LED arrays, etc. The light emitted from the light sources is reflected from the print media 150 onto a mirror 142, which directs the light on a lens system (not shown) housed in a holder 144. A charge coupled device (CCD) for sensing reflected light is also received in holder 144. The light sources are designed so that the boundaries of the light rays, known as the optical spread 148, will narrow as they reflect off of the print media. The optical spread 148 will continue to narrow to a width corresponding to the width of the CCD array. The mirror 142 is attached to the enclosure 128 and is mounted parallel to the light sources and inclined with respect to the print media to allow the reflected light to be channeled onto the lens system housed in holder 144, as indicated by optical spread 148.

The lens system is designed to focus the light received from the mirror directly on the CCD. The design of a lens system to accomplish this objective is known in the art. Although the design of the lens requires a specific focal length based on the dimensions of the scanner, the lens itself may take on several different shapes, e.g., aspherical. It is desirable that the lens system focus the image onto the CCD in order to produce a one-to-one correspondence between the print media image pixel and the CCD sensor pixel. Once the distance between image pixels is known and the particular CCD is chosen, a lens system can be readily constructed according to the commonly known formulas of optics.

The CCD produces an analog output signal corresponding to the light intensity received thereon. The analog signals are converted to digital signals by an analog-to-digital converter (not shown in FIG. 2) housed in holder 144. The digital signals are routed from the holder 144 to a cable outlet 146 with conventional wiring (not shown in FIG. 4) contained in the enclosure 128. A cable 152 is attached to the cable outlet to receive the digital signals from the analog-to-digital converter as well as provide the necessary control signals to the CCD, the analog-to-digital converter, and the light sources 136, 138, 140.

Figure 3:
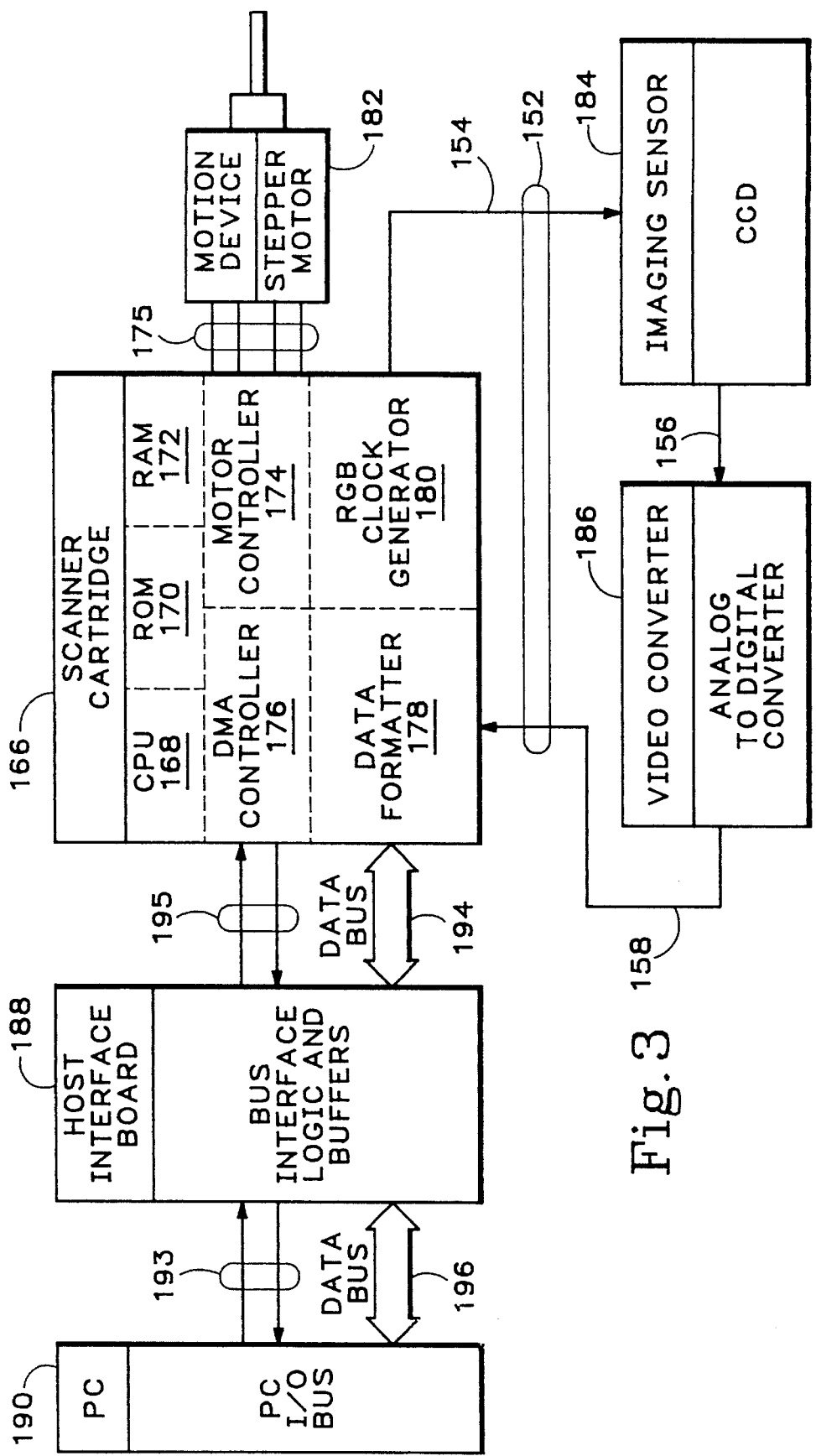
FIG. 3 is a block level diagram of the control circuitry used to control the printing and scanning operations of the present invention.

The scanner electronics required to process the image and control the printer mechanism are enclosed in a scanner cartridge, pictured diagrammatically in FIG. 3 at 166. The scanner cartridge is designed to fit within the printer access port 114 (FIG. 4), which is used to accommodate font cartridges as indicated above. Within the scanner cartridge is a printed circuit board (PCB) on which all of the electronic components are mounted. The scanner cartridge encloses the entire PCB except for a male edge connector having a plurality of metal contacts which, when inserted into the printer access port 114, provide an electrical path between the printer data and control signals and the scanner electronics, as well as providing connections to power and ground. Once the scanner cartridge is inserted into the printer access port 114, the scanner cartridge has complete access to the printer electronics. In this manner, the scanner cartridge is able to communicate with all the printer electronics, including stepper motor 182.

In order to provide the needed computing and control capability for the scanner, the scanner cartridge has within it a complete microprocessor based system. The system includes: a general purpose microprocessor (CPU) 168, for executing program instructions; a read-only-memory (ROM) 170, for program storage; and a random-access-memory (RAM) 172, for temporary storage. In addition, the scanner cartridge includes a direct-memory-access (DMA) controller 176, for arbitrating with the printer controller for control of the printer electronics. The combination of these components to form a functioning control system is known in the art of digital electronics.

Since the scanner cartridge temporarily assumes control of the printer electronics when scanning is performed, the scanner cartridge also has a motor controller 174, able to control the stepper motor 182 through stepper control lines 175 for advancing the print media responsive to the scanner operation. In addition, a red-green-blue (RGB) clock generator 180 sequences the light sources 136,138,140 as well as controls the CCD 184 and the analog-to-digital converter 186 (both contained within holder 144 in FIG. 2) via control lines 154. The control lines 154 are contained within cable 152. The analog data is shifted out of the CCD 184 along signal line 156 under the control of the RGB clock generator 180 into the analog-to-digital converter 186. The analog data is convened to a digital format by the analog-to-digital converter 186 and is returned to the data formatter 178 via signal line 158 also contained within cable 152. The data formatter 178 formats the digital image into a format expected by the personal computer 190. In addition to formatting the data, in the preferred embodiment, the data formatter 178 also buffers the data in order to transfer multiple bytes of data to the PC 190.

The digital data received by the data formatter 178 from the analog-to-digital converter 186 is transferred to the host PC 190 via a host interface board 188. The host interface board 188 is an industry standard printed circuit board form factor capable of being inserted into the backplane of the PC 190. The board 188 contains the industry standard male edge connector which allows it to be inserted into the standard female connector receptacle included within all PCs. The host interface board 188 also includes the necessary logic and buffers to allow the scanner cartridge 166 to communicate with the PC 190 over the PC data bus 196. The host interface board also provides a scanner cartridge connector (not shown) for receiving the scanner control lines 195 and scanner data bus 194. The host interface board 188 acts as a gateway between the scanner cartridge 166 and the PC 190. The logic (not shown in FIG. 3) on the host interface board 188 receives a request to transfer data from the DMA controller 176 over scanner control lines 195 and translates the request to a format required by the PC control lines 193. The buffers (not shown in FIG. 3) on the host interface board 188 selectively enable the digital data on a scanner data bus 194 to be transferred to the PC data bus 196 upon the receipt of a DMA acknowledgement from the PC 190 over PC control lines 193.

The request to transfer the digital data from the scanner cartridge to the PC 190 is generated by the DMA controller 176. The DMA controller 176 handshakes the digital data over the scanner data bus 194 by the use of scanner control lines 193. The scanner control lines 195 encode a standard bus arbitration protocol, to coordinate the transfer with the PC CPU (not shown in FIG. 3). Once the DMA controller 176 has been granted control of the PC bus 196, the host interface board 188 enables the bus interface logic, thereby allowing the digital data to be transferred onto the PC data bus 196. This sequence continues until all of the digital data is buffered in data formatter 178 transferred over the PC bus 196.

The scanning sequence is operable under the control of a scanner driver program operating on the PC 190. The PC 190 issues a command to the printer over a normal communication channel (not shown) between the PC 190 and the printer, e.g., parallel or serial channel, to commence scanning. The command consists of a predetermined escape sequence which is parsed by the printer CPU to determine the purpose of the command. Once the command has been decoded, the printer CPU notifies the scanner CPU 168 to assume control of the printer electronics. The scanner CPU 168 will then execute the proper sequence of enabling light sources 136, 138, 140, capturing the image data, converting the analog image data to d digital representation, formatting the data to be received over the PC 190, transferring the data to the PC over the PC data bus 196, advancing the print media, and then repeating the sequence until the entire image is scanned.

Having described and illustrated the principles of the invention in a preferred embodiment thereof, it should be apparent that the invention can be modified in arrangement and detail without departing from such principles.

We claim all modifications and variation coming within the spirit and scope of the following claims:

1. A method for operating an ink-jet printer for scanning images, the printer being of the type having a frame defining a print media path, means for advancing print media along said media path, an output path for receiving print media after passing through said print media path, a carriage mounted on said frame for traversing said media path, an ink-jet print head mountable on said carriage for printing upon media received in said media path, and means for selecting between optically scanning print media received in said media path in a scanning mode and printing upon media received in said media path in a printing mode, said method comprising the steps of:
    printing on said print media in the printing mode;
    placing said printer in the scanning mode;
    inserting print media having an image thereon into a print media input of the printer;
    mounting a scanner on the printer output tray;
    advancing the print media through the print media path in the printer; and
    scanning the image as the print media moves through the print media path.

2. The method of claim 1 wherein said method further includes the step of connecting the scanner to control electronics for controlling scanning of said image.

3. The method of claim 2 wherein said printer is of the type having a font cartridge receptacle for receiving a font cartridge and where the step of connecting the scanner to control electronics comprises the step of plugging a cartridge containing the electronics into said font cartridge receptacle.

4. An apparatus for scanning optical images and printing comprising:
    a frame defining a print media path having a beginning and an end;
    means for advancing print media along said media path;
    means for printing upon media received in said media path;
    an output tray at the end of said media path for receiving print media after passing through said print media path;
    a scanner removably mounted on said output tray for optically scanning media received in said output tray; and
    means for selecting between optically scanning print media received in said output tray and printing upon media received in said media path.

5. An apparatus for scanning optical images and printing as recited in claim 1 wherein said scanner optically scans said print media received in said output tray responsive to means for advancing print media.

6. An apparatus for scanning optical images and printing as recited in claim 1 wherein said means for printing upon media received in said output tray comprises:
    a carriage mounted on said frame for traversing said media path; and
    a print head mountable on said carriage for printing upon media received in said media path.

7. An apparatus for scanning optical images and printing as recited in claim 1 wherein said scanner comprises:
    a scanner enclosure defining a light transmission path and a light reception path mounted on said frame and having an opening on a side juxtaposed to said output tray;
    a light source mounted on said scanner enclosure for emitting light through the light transmission path;
    a light receptor mounted on said scanner enclosure for receiving the emitted light reflected off the print media through the light reception path;
    means for converting light received by said light receptor to electrical data;
    means for focusing light mounted on said scanner enclosure within the light reception path for focusing light onto said light receptor;
    means for directing the emitted light reflected off the print media onto said light focusing means, said directing means being mounted on said scanner enclosure within the light reception path between the print media and said light focusing means.

8. An apparatus for scanning optical images and printing as recited in claim 7 wherein said light source spans the width of the print media received in said output tray and said light source further comprises:
- a first light source mounted on the scanner enclosure within the light transmission path so that light from said first light source defines an image area on the print media received in said output tray;
- a second light source mounted on the scanner enclosure parallel to said first light source so that light from said second light source illuminates the image area; and
- a third light source mounted on the scanner enclosure parallel to said first light source so that light from said third light source illuminates the image area.

9. An apparatus for scanning optical images and printing connected to a host computer comprising:
- a printer having a frame defining a print media path and an output tray for receiving a scanner, said printer having means for advancing print media along said print media path to said output tray, and said printer having a carriage mounted on said frame for receiving a print head for printing on said print media;
- a scanner mounted on said output tray for optically scanning media received in said output tray;
- a printer controller electrically connected to said printer for controlling said means for advancing print media, said carriage, and said print head;
- a controller interface port electrically connected to said printer controller for connecting the printer controller to a scanner electronics cartridge;
- a communication channel electrically connected between said printer controller and said host computer for transferring data between the printer controller and the host computer.

10. An apparatus for scanning optical images and printing connected to a host computer according to claim 9 further comprising a scanner electronics cartridge electrically connected to the controller interface port and to said scanner for controlling said means for advancing print media and said scanner.

11. An apparatus for scanning optical images and printing connected to a host computer according to claim 10 wherein said scanner electronics cartridge further comprises:
- a central processing unit having a bus and control signals for executing instructions received over said bus;
- a read only memory electrically connected to said central processing unit responsive to requests from said central processing unit;
- a read/write memory electrically connected to said central processing unit responsive to requests from said central processing unit;
- a direct memory access controller electrically connected to said central processing unit responsive to requests from said central processing unit; and
- a data formatter electrically connected to said central processing unit responsive to requests from said central processing unit.

12. An apparatus for scanning optical images and printing connected to a host computer according to claim 9 wherein said communication channel comprises:
- a host computer bus interface card electrically connected to said host computer for transferring data between said interface card and said host computer; and
- an input/output cable electrically connected between said printer controller and said interface card for transferring data between the printer controller and the interface card.

13. An apparatus for scanning optical images and printing connected to a host computer according to claim 6 wherein said scanner comprises:
- a scanner enclosure defining a light transmission path and a light reception path mounted on said frame and having an opening on a side juxtaposed to said output tray;
- a light source mounted on said scanner enclosure for emitting light through the light transmission path;
- a CCD array mounted on said scanner enclosure for receiving the emitted light reflected off the print media through the light reception path;
- an analog-to-digital converter mounted on said scanner enclosure operatively coupled to said CCD array;
- a lens mounted on said scanner enclosure within the light reception path for focusing light onto said light receptor; and
- a mirror mounted on said scanner enclosure within the light reception path between the print media and said lens for directing the emitted light reflected off the print media onto said lens.

14. An apparatus mountable on a printer output tray for scanning images on print media driven through a print media path in the printer, said apparatus comprising:
- a hood mountable on said printer output tray;
- a light source mounted on an internal position of said hood and directed toward said print media path;
- a mirror for reflecting an image on print media illuminated by said light source; and
- a sensor for detecting such a reflected image and converting it to an electrical signal.

15. The apparatus of claim 14 wherein said output tray is substantially rectangular and said hood includes a substantially rectangular base, said base being supported by said output tray when said apparatus is mounted on said output tray.

16. The apparatus of claim 15 wherein said base includes a substantially rectangular opening of a size which permits light from said light source to illuminate an image on print media entering said output tray from said print media path.

17. The apparatus of claim 16 wherein said hood includes an elevated upper portion immediately adjacent said printer when said apparatus is mounted thereon.

18. The apparatus of claim 17 wherein said upper portion extends between said elevated portion adjacent said printer and a lower portion near the distal end of said output tray.

19. The apparatus of claim 18 wherein said mirror is received in said elevated portion.

20. The apparatus of claim 18 wherein said sensor is received in said lower portion.

* * * * *